(12) United States Patent
Minor et al.

(10) Patent No.: US 6,687,085 B2
(45) Date of Patent: Feb. 3, 2004

(54) PERPENDICULAR WRITE HEAD WITH HIGH MAGNETIZATION POLE MATERIAL AND METHOD OF FABRICATING THE WRITE HEAD

(75) Inventors: Michael Kevin Minor, Gibsonia, PA (US); Robert Earl Rottmayer, Wexford, PA (US); Michael Allen Seigler, Pittsburgh, PA (US); Andrew Robert Eckert, Pittsburgh, PA (US); Mark William Covington, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 28 days.

(21) Appl. No.: 10/037,932

(22) Filed: Jan. 4, 2002

(65) Prior Publication Data

US 2003/0016470 A1 Jan. 23, 2003

Related U.S. Application Data

(60) Provisional application No. 60/306,068, filed on Jul. 17, 2001.

(51) Int. Cl.[7] .............................................. G11B 5/147
(52) U.S. Cl. ...................................................... 360/126
(58) Field of Search ................................. 360/126, 125

(56) References Cited

U.S. PATENT DOCUMENTS

| | | | |
|---|---|---|---|
| 3,805,291 A | 4/1974 | Sakurai | |
| 3,813,766 A | 6/1974 | Brock et al. | |
| 4,423,450 A | 12/1983 | Hamilton | |
| 4,441,131 A | 4/1984 | Osanai | |
| 4,639,810 A | 1/1987 | Sakai | |
| 4,672,494 A | 6/1987 | Furuya et al. | |
| 4,731,157 A | 3/1988 | Lazzari | |
| 4,742,413 A * | 5/1988 | Schewe | 360/126 |
| 4,751,598 A * | 6/1988 | Hamilton | 360/110 |
| 4,839,761 A | 6/1989 | Gatzen | |
| 4,873,599 A * | 10/1989 | Sueoka | 360/126 |
| 4,982,301 A | 1/1991 | Endo | |
| 5,068,959 A | 12/1991 | Sidman | |
| 5,075,280 A * | 12/1991 | Pisharody et al. | 505/171 |
| 5,311,387 A * | 5/1994 | Mallary | 360/126 |
| 5,372,698 A | 12/1994 | Liao | |
| 5,655,286 A * | 8/1997 | Jones, Jr. | 29/603.13 |
| 5,680,283 A * | 10/1997 | Tanaka et al. | 360/125 |
| 5,991,126 A * | 11/1999 | Hayashi et al. | 360/125 |
| 6,259,583 B1 | 7/2001 | Fontana, Jr. et al. | |
| 6,301,076 B1 | 10/2001 | Stageberg et al. | |
| 2001/0017746 A1 | 8/2001 | Nishida et al. | |

* cited by examiner

Primary Examiner—Robert S. Tupper
(74) Attorney, Agent, or Firm—Robert P. Lenart, Esq.; Pietragallo, Bosick & Gordon

(57) ABSTRACT

A write head comprises a yoke including a top pole and a bottom pole, the top pole including a layer of insulating material, a layer of a first magnetic material positioned on a surface of the layer of insulating material, the first magnetic material having a first end positioned adjacent to an air bearing surface of the write pole, and a layer of a second magnetic material positioned on the surface of the layer of insulating material, the second magnetic material having a lower magnetic moment than the first magnetic material and being positioned to conduct magnetic flux between the return pole and the layer of first magnetic material. The method of constructing the write head and a disc drive including the write head are also included.

14 Claims, 9 Drawing Sheets

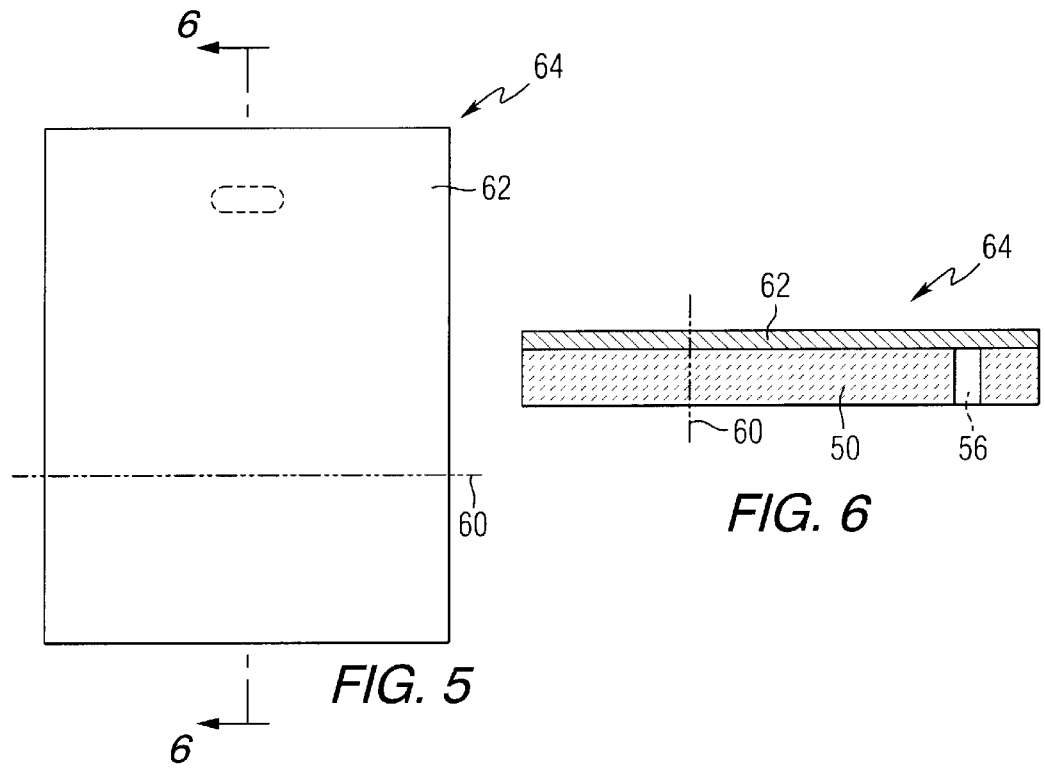
FIG. 5
FIG. 6
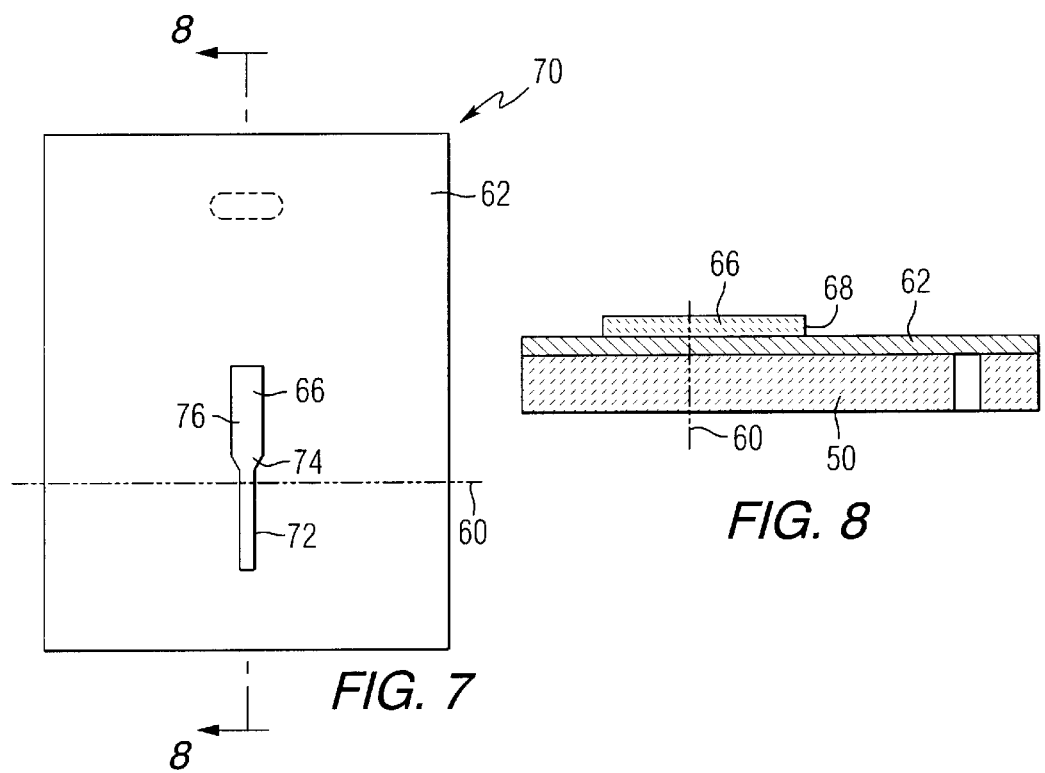
FIG. 7
FIG. 8

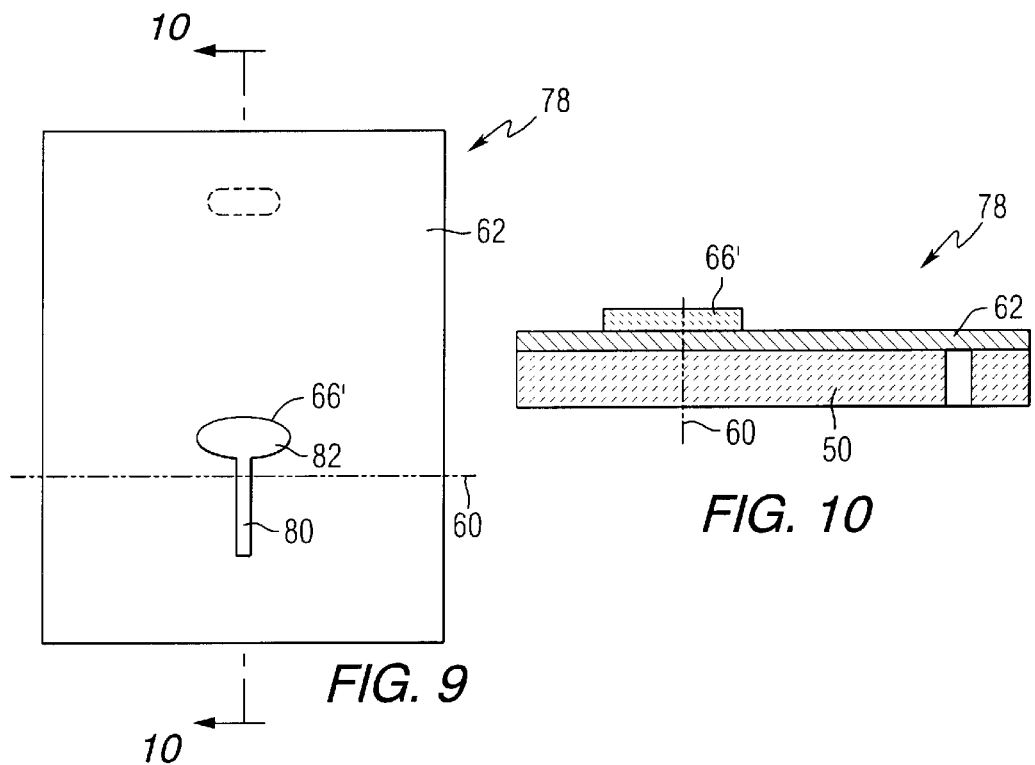
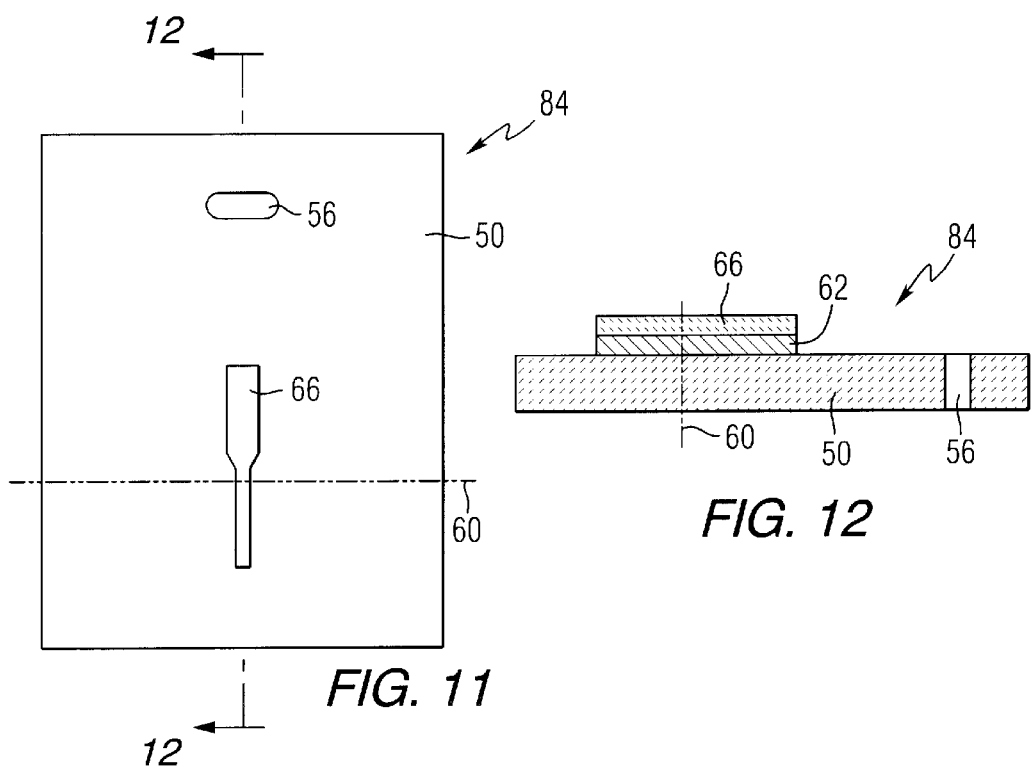

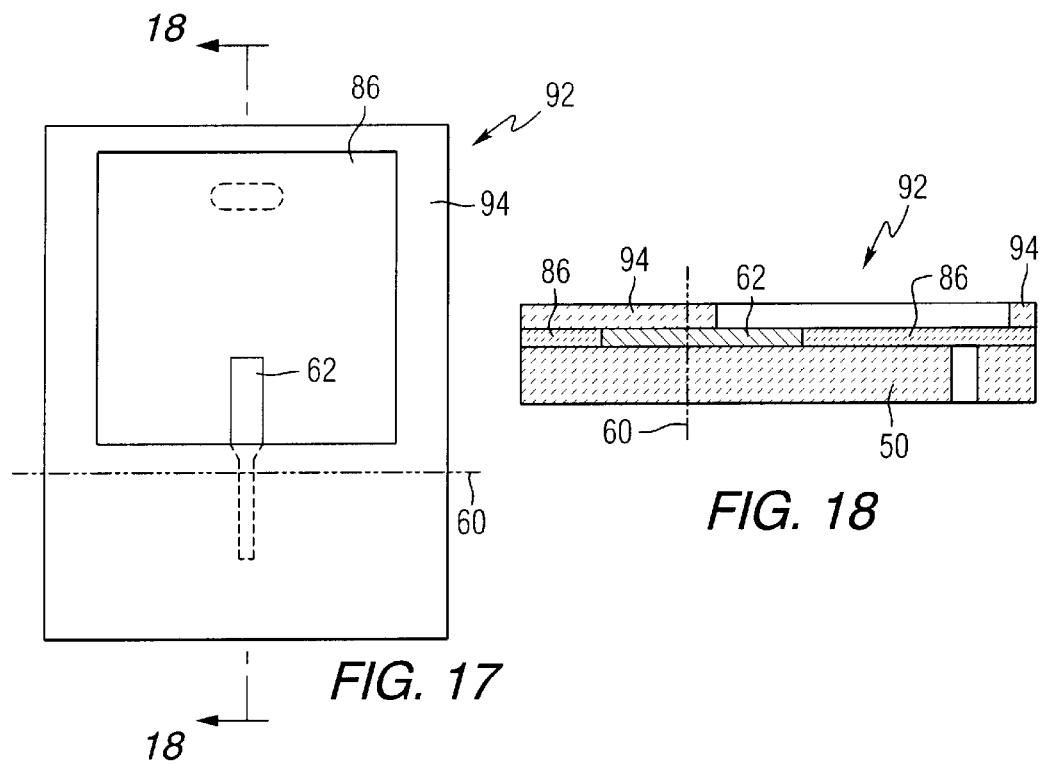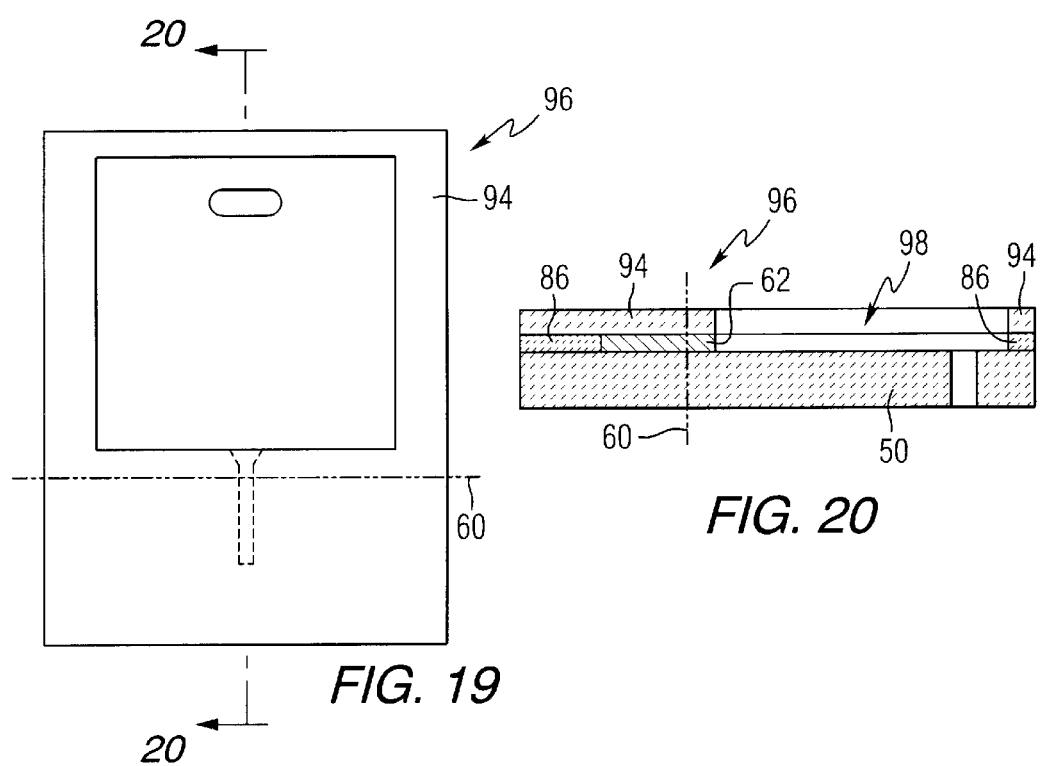

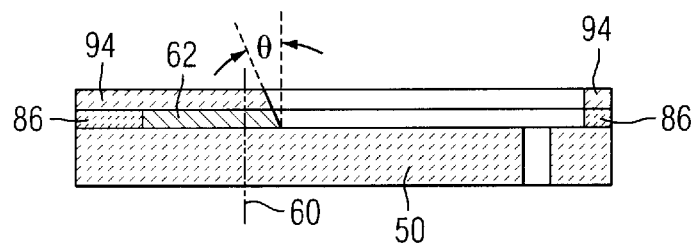
FIG. 21
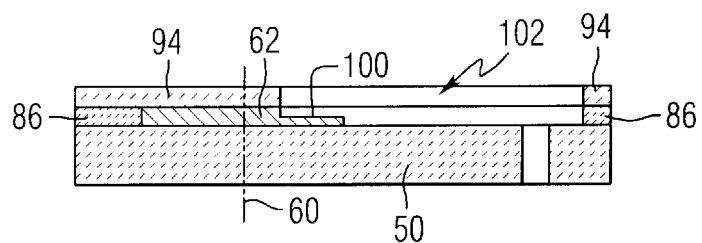
FIG. 22
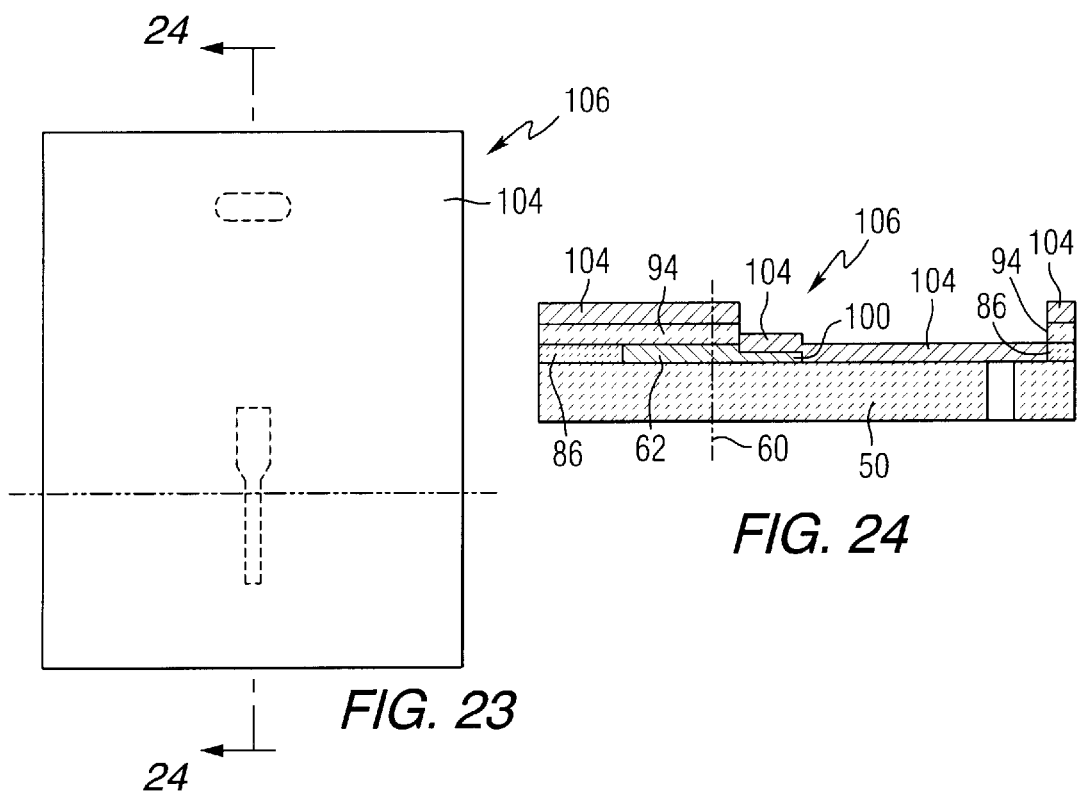
FIG. 23
FIG. 24

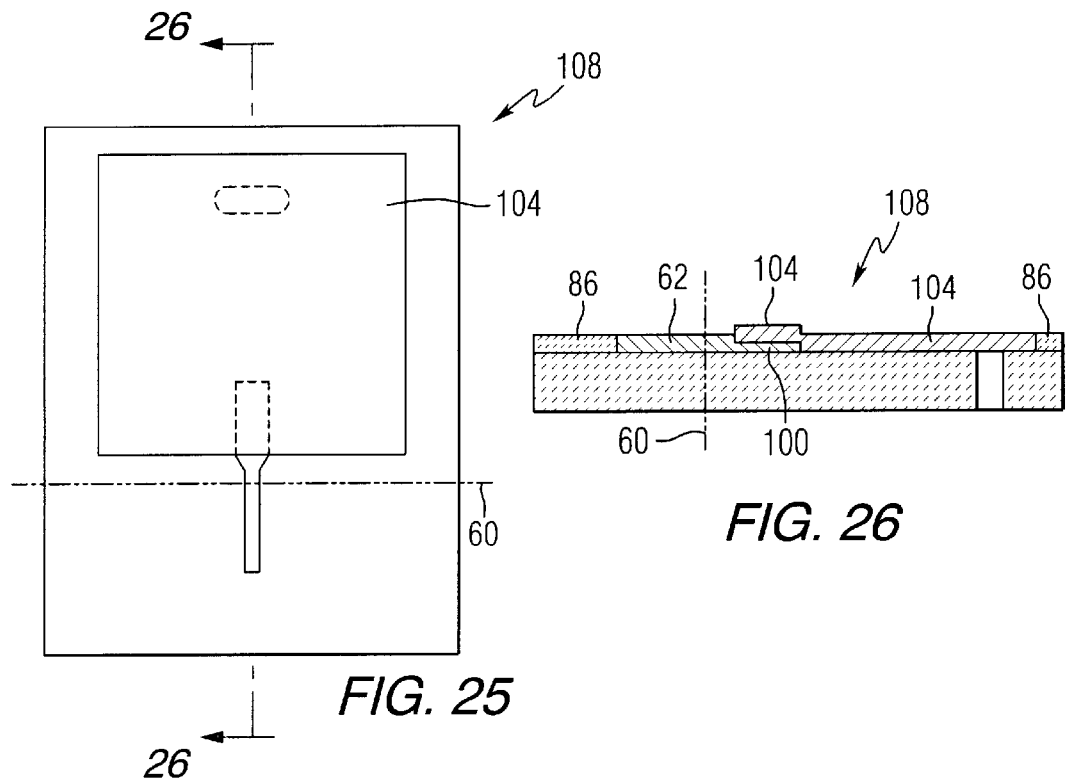
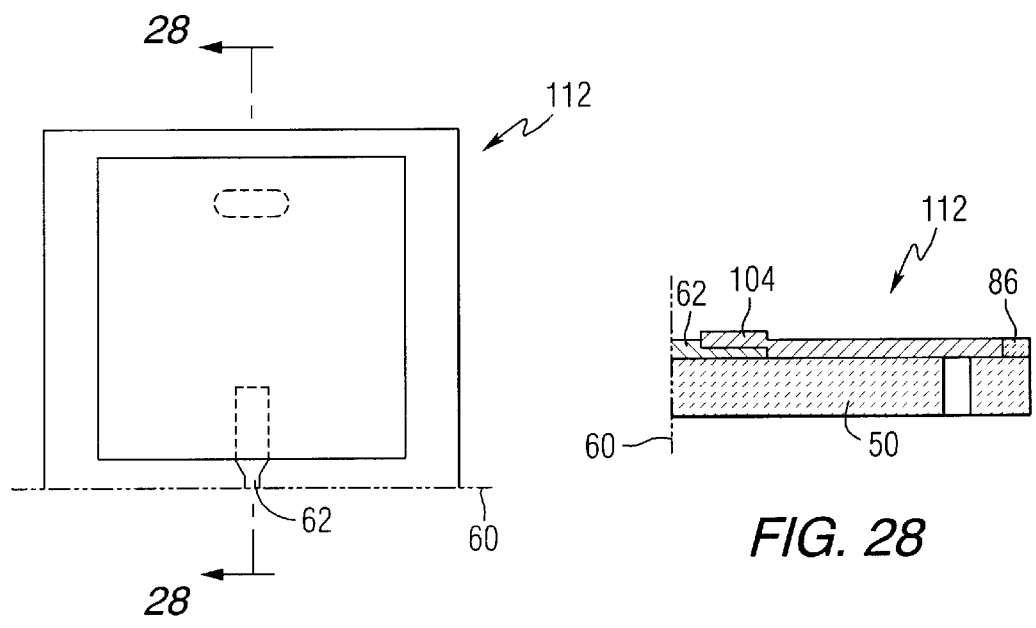

PERPENDICULAR WRITE HEAD WITH HIGH MAGNETIZATION POLE MATERIAL AND METHOD OF FABRICATING THE WRITE HEAD

CROSS REFERENCE TO RELATED APPLICATION

This application claims the benefit of U.S. Provisional Patent Application No. 60/306,068, filed Jul. 17, 2001.

FIELD OF THE INVENTION

This invention relates to magnetic transducers, and more particularly, to write heads for use in disc drives and methods for fabricating such write heads.

BACKGROUND OF THE INVENTION

Disc drive write heads for perpendicular recording typically include a soft ferromagnetic yoke that is wrapped around a coil of one or more turns. An electrical current in a coil, produces a magnetic field that aligns the yoke magnetization along the field direction. For perpendicular writing, a soft underlayer is typically employed in the magnetic recording media such that the write field extends between the pole tip and soft underlayer. When the write field exceeds the coercivity and demagnetization field of the media, a domain forms with its magnetization aligned along the write field direction. These domains form the bits of digital data that can be detected by a read head.

The objective of increasing magnetic storage areal densities requires extremely narrow track-widths in the recording media. The narrowing of the track width will necessarily reduce the cross-sectional area of the writer pole tip. This will increase the yoke reluctance and, consequently, decrease the writer efficiency. A drop in efficiency will require a larger write current. However, the write current cannot be made arbitrarily large without producing undesirable levels of Joule heating. Furthermore, it is difficult and expensive to produce large-amplitude current pulses with fast rise times. In addition, the use of high-moment materials in the writer requires larger write currents to switch the magnetization, in comparison to heads made with softer, lower moment alloys.

The effective write field of a head is related to head geometry and the saturation magnetization ($4\pi M_s$) of the pole material. In the perpendicular head geometry, the write field utilizes the deep gap field to "write" as opposed to the fringing field utilized in longitudinal head geometries. Perpendicular transducers typically include a top pole and a bottom pole, with the top pole having a smaller cross-sectional area than the bottom pole at an air bearing surface. A single material is usually used for the top pole. This top pole material must exhibit a large saturation magnetization ($4\pi M_s$), low coercivity, and a well-defined uniaxial anisotropy. The largest known saturation magnetization at room temperature is exhibited by $Fe_{65}Co_{35}$ which has a value of ~2.4T. However, FeCo has not been used as a perpendicular top pole. One characteristic that prevents the use of FeCo in top poles is that the material is not uniaxial, therefore, it has nearly zero permeability which would result in an inefficient write head. In addition to magnetics, high moment materials such as FeCo, which are sputtered, have to be etched in order to define the track width. For areal densities of 100 Gbit/in$^2$ and greater, track widths are less than 100 nm. For these small track widths, a process such as reactive ion etching (RIE) is typically used, however, FeCo has no known volatile reaction products at practical processing temperatures and cannot be etched via RIE.

In summary, a perpendicular write head having a top pole including a high magnetic saturation material is desirable, however, the inherent magnetics and the need to form narrow track widths have prevented the use of materials such as FeCo in top poles.

There is a need for a magnetic write head that can achieve increased areal data densities in magnetic recording media.

SUMMARY OF THE INVENTION

A write head for a disc drive constructed in accordance with this invention comprises a yoke including a top pole and a bottom pole, the top pole including a layer of insulating material, a layer of a first magnetic material positioned on a surface of the layer of insulating material, the first magnetic material having a first end positioned adjacent to an air bearing surface of the write pole, and a layer of a second magnetic material positioned on the surface of the layer of insulating material, the second magnetic material having a lower magnetic moment than the first magnetic material and being positioned to conduct magnetic flux between the return pole and the layer of first magnetic material.

The invention also encompasses a method of fabricating write heads including: providing a yoke including a top pole and a bottom pole, the top pole including a layer of insulating material, depositing a layer of a first magnetic material on a surface of the layer of insulating material, the first magnetic material having a first end positioned adjacent to an air bearing surface of the write pole, and depositing a layer of a second magnetic material on the surface of the layer of insulating material, the second magnetic material having a lower magnetic moment than the first magnetic material and being positioned to conduct magnetic flux between a return pole and the layer of first magnetic material.

The invention further encompasses a disc drive including a motor for rotating at least one magnetic storage medium, a write head for producing areas of magnetization on the magnetic storage medium, an arm for supporting the write head, an actuator for pivoting the arm to position the write head, and the write head including a yoke including a top pole and a bottom pole, the top pole including a layer of insulating material, a layer of a first magnetic material positioned on a surface of the layer of insulating material, the first magnetic material having a first end positioned adjacent to an air bearing surface of the write pole, and a layer of a second magnetic material positioned on the surface of the layer of insulating material, the second magnetic material having a lower magnetic moment than the first magnetic material and being positioned to conduct magnetic flux between the return pole and the layer of first magnetic material.

BRIEF DESCRIPTION OF THE DRAWINGS

FIG. 5 is a plan view of another intermediate structure formed during fabrication of the top pole of the write head of FIG. 2;

FIG. 6 is a cross-sectional view of the structure of FIG. 5 taken along line 6—6;

FIG. 7 is a plan view of another intermediate structure formed during fabrication of the top pole of the write head of FIG. 2;

FIG. 8 is a cross-sectional view of the structure of FIG. 5 taken along line 8—8;

FIG. 9 is a plan view of another intermediate structure formed during fabrication of the top pole of the write head of FIG. 2;

FIG. 10 is a cross-sectional view of the structure of FIG. 9 taken along line 10—10;

FIG. 11 is a plan view of another intermediate structure formed during fabrication of the top pole of the write head of FIG. 2;

FIG. 12 is a cross-sectional view of the structure of FIG. 11 taken along line 12—12;

FIG. 17 is a plan view of another intermediate structure formed during fabrication of the top pole of the write head of FIG. 2;

FIG. 18 is a cross-sectional view of the structure of FIG. 17 taken along line 18—18;

FIG. 19 is a plan view of another intermediate structure formed during fabrication of the top pole of the write head of FIG. 2;

FIG. 20 is a cross-sectional view of the structure of FIG. 19 taken along line 20—20;

FIG. 21 is a cross-sectional view of an alternative intermediate structure formed during fabrication of the top pole of the write head of FIG. 2;

FIG. 22 is a cross-sectional view of another alternative intermediate structure formed during fabrication of the top pole of the write head of FIG. 2;

FIG. 23 is a plan view of another intermediate structure formed during fabrication of the top pole of the write head of FIG. 2;

FIG. 24 is a cross-sectional view of the structure of FIG. 23 taken along line 24—24;

FIG. 25 is a plan view of another intermediate structure formed during fabrication of the top pole of the write head of FIG. 2;

FIG. 26 is a cross-sectional view of the structure of FIG. 26 taken along line 26—26;

FIG. 27 is a plan view of another intermediate structure formed during fabrication of the top pole of the write head of FIG. 2;

FIG. 28 is a cross-sectional view of the structure of FIG. 26 taken along line 28—28;

DETAILED DESCRIPTION OF THE INVENTION

Figure 1:
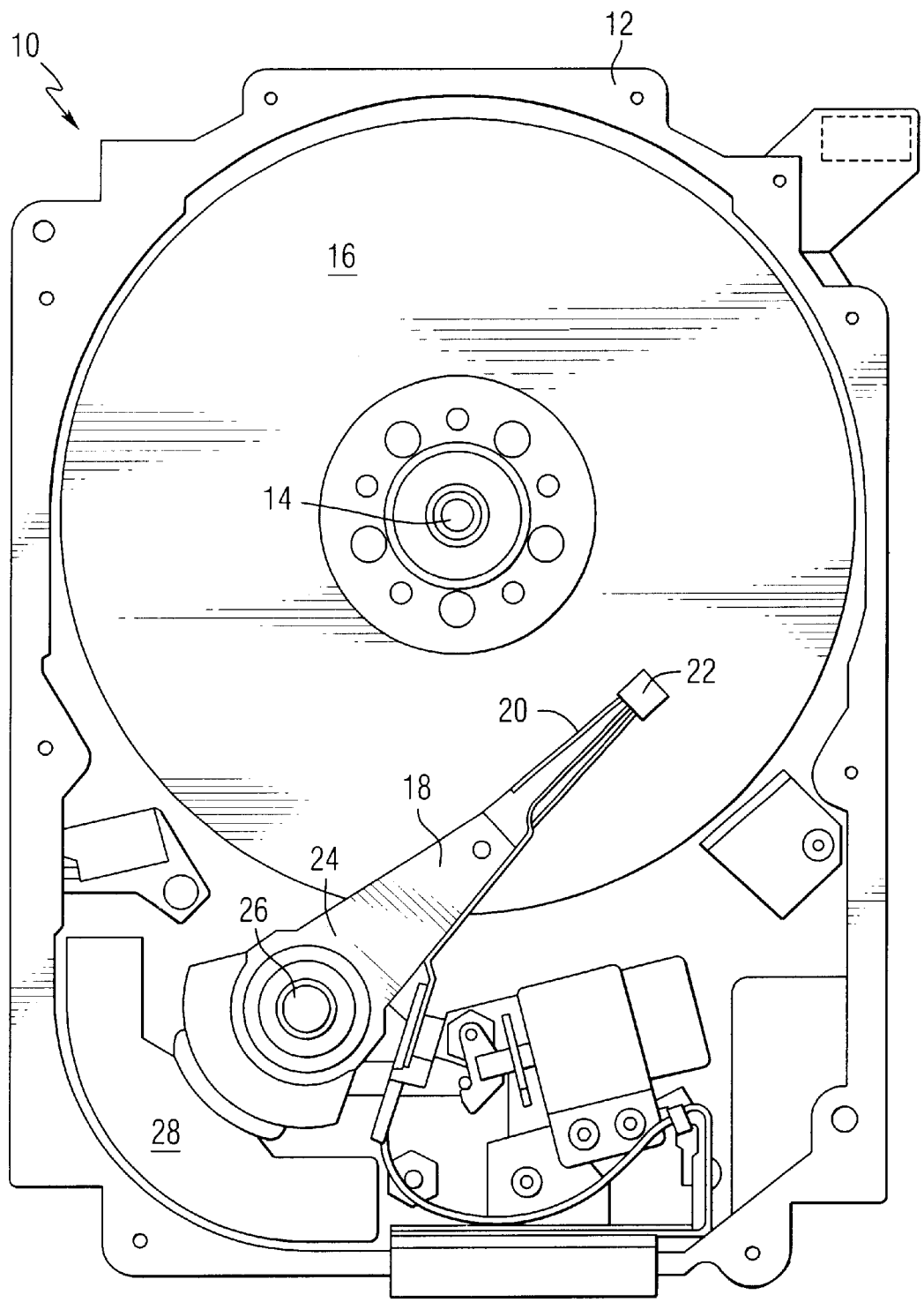
FIG. 1 is a pictorial representation of a disc drive that can use magnetic write heads constructed in accordance with this invention.

Referring to the drawings, FIG. 1 is a pictorial representation of a disc drive 10 that can utilize write heads constructed in accordance with this invention. The disc drive includes a housing 12 (with the upper portion removed and the lower portion visible in this view) sized and configured to contain the various components of the disc drive. The disc drive includes a spindle motor 14 for rotating at least one magnetic storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

Figure 2:
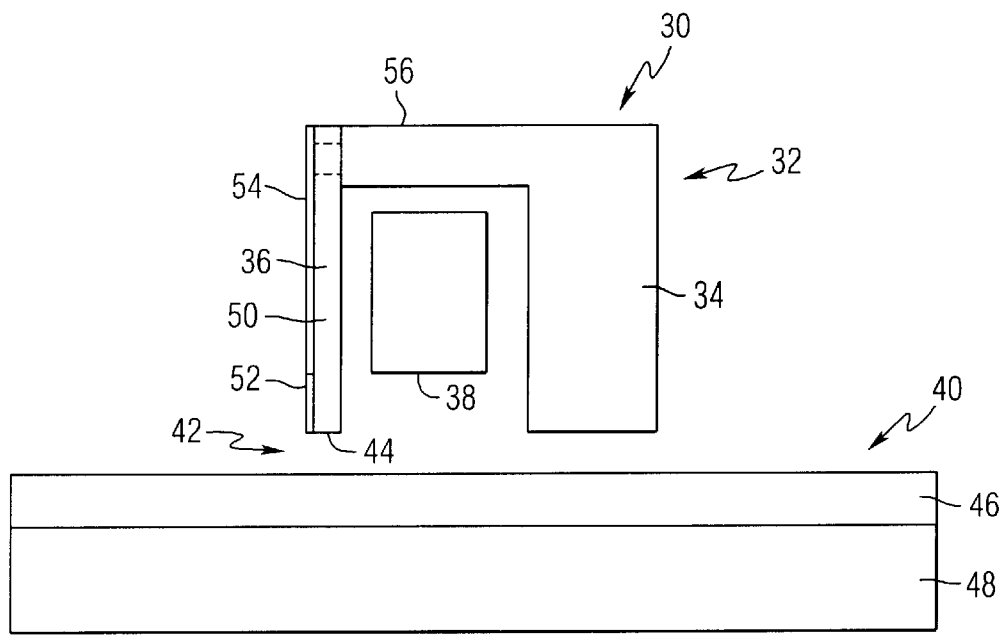
FIG. 2 is a schematic representation of a disc drive write head constructed in accordance with this invention.

FIG. 2 is a schematic representation of a disc drive write head 30 constructed in accordance with this invention. The write head includes a yoke 32 including a flux return pole 34, also called a bottom pole, and a write pole 36, also called a top pole. A coil 38 or stripline is positioned adjacent to the yoke such that current passing through the coil or stripline induces a magnetic field in the yoke. In operation, the yoke is positioned adjacent to a magnetic medium 40 and separated from the magnetic medium by an air bearing 42. The end of the write pole closest to the magnetic medium is referred to as the air-bearing surface 44. The magnetic medium includes a magnetically hard layer 46 and a magnetically soft layer 48. In accordance with a well known process, a change in the flux in the yoke causes a change in the magnetization of layer 46 in the magnetic medium.

The top pole includes a layer of insulating material 50, a layer of high moment magnetic material 52 and a layer of lower magnetic moment magnetic material 54. The layer of high moment magnetic material 52 is positioned such that an edge of the material lies adjacent to the air bearing surface. The layer of high moment magnetic material 52 is positioned to be magnetically coupled to the layer of lower moment magnetic material 54. A pedestal 56 of magnetic material, for example NiFe, magnetically couples the layer of lower moment magnetic material 54 to the bottom pole.

Figure 3:
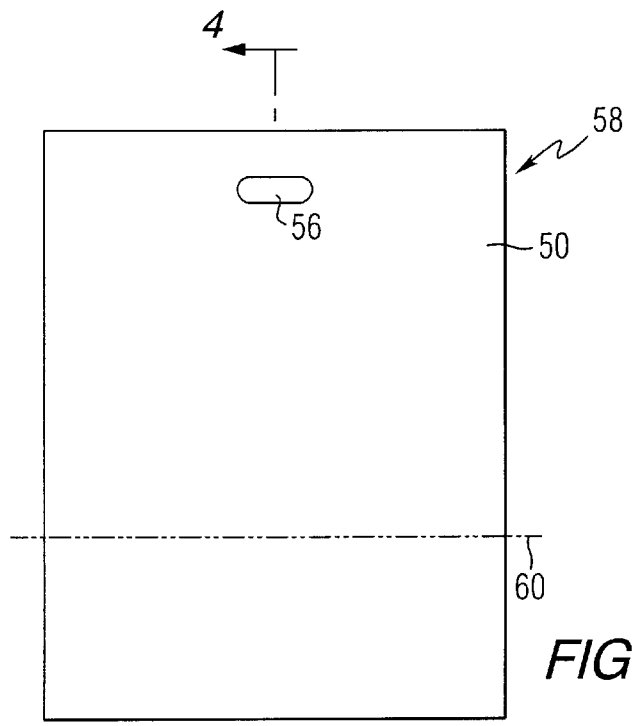
FIG. 3 is a plan view of an intermediate structure formed during fabrication of the top pole of the write head of FIG. 2.
Figure 4:
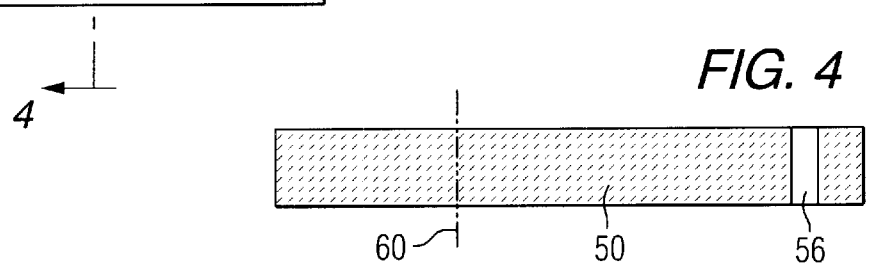
FIG. 4 is a cross-sectional view of the structure of FIG. 3 taken along line 4—4.

FIG. 3 is a plan view of an intermediate structure 58 formed during fabrication of the top pole 36 of the write head of FIG. 2, and FIG. 4 is a cross-sectional view of the structure of FIG. 3 taken along line 4—4. Structure 58 includes a layer of insulating substrate material 50, which can be alumina ($Al_2O_3$) that has a top surface which is co-planar with an end of the NiFe pedestal. The pedestal 56 passes through the substrate and is ferromagnetically coupled to the bottom pole. Line 60 indicates the position of the air bearing surface that will be formed in a subsequent processing stage.

Next, a layer of high moment magnetic material 62, which can be FeCo, and more preferably 2.4T $Fe_{65}Co_{35}$, is deposited on the substrate to produce the intermediate structure 64 shown in FIGS. 5 and 6. This layer can be formed using physical vapor deposition (PVD) although other techniques such as plating or IBD could be used.

A resist 66 is then formed on top of layer 62 to define the track width. This produces the intermediate structure 70 as shown in FIGS. 7 and 8. The resist includes a first section 72, a second section 74 and a third section 76. First section will eventually form the pole tip. The width of the first section in a direction parallel to the plane of the air bearing surface is less than the width of the third section. The second section is a transition section between the first and third section. The use of a wider third section can improve magnetic coupling with a second layer of magnetic material that will be applied later in the process. Resist layer 66 can be formed using e-beam lithography.

FIGS. 9 and 10 show an alternative shape 66' for the e-beam resist. In the intermediate structure 78 of FIG. 9, the e-beam resist includes a relatively narrow portion 80 and a portion 82 of a larger cross-sectional area. Here again, use of a wider portion 82 can improve magnetic coupling with a second layer of magnetic material that will be applied later in the process.

Next the first layer of FeCo magnetic material is cleared from everywhere except under the e-beam resist. The removal of this material can be performed using ion milling, although RIBE could be used, which defines the track width. Using the e-beam resist pattern of FIG. 7, the resulting intermediate structure 84 is shown in FIGS. 11 and 12. Structure 84 can be achieved by subjecting structure 70 to an ion milling operation to remove the layer of high magnetization material 62 except for that portion under the resist 66. The ion mill must clear the FeCo from the NiFe pedestal for efficient flux conduction.

Figures 13, 14:
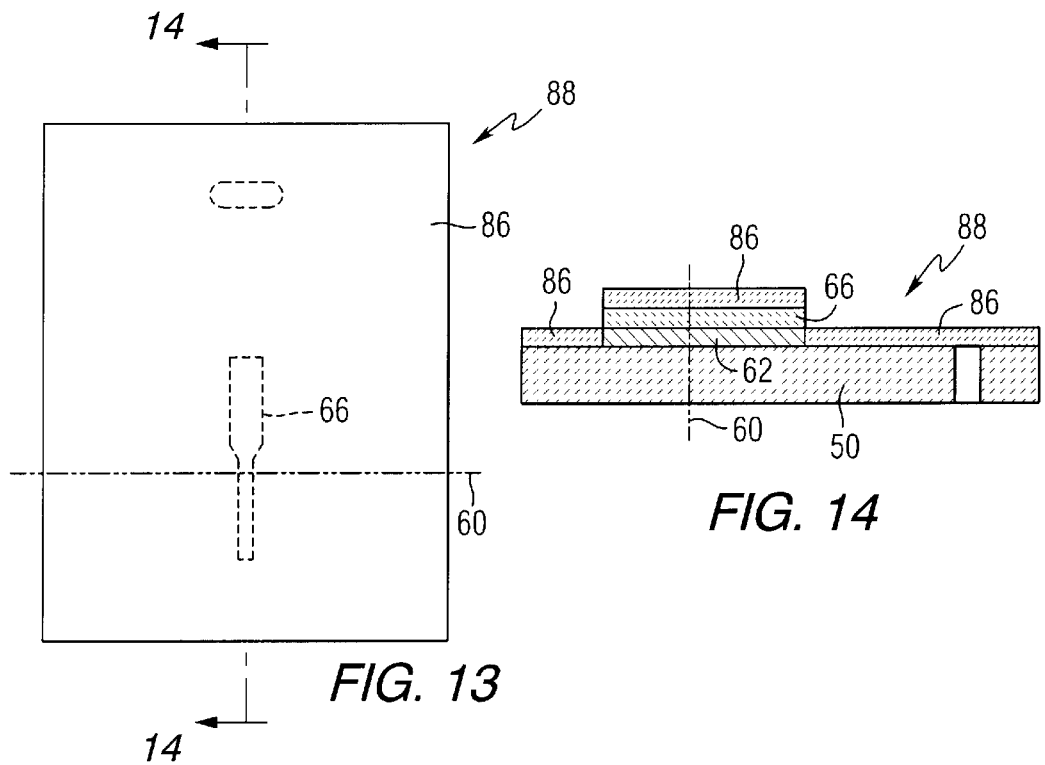
FIG. 13 is a plan view of another intermediate structure formed during fabrication of the top pole of the write head of FIG. 2.
FIG. 14 is a cross-sectional view of the structure of FIG. 13 taken along line 14—14.
Figures 15, 16:
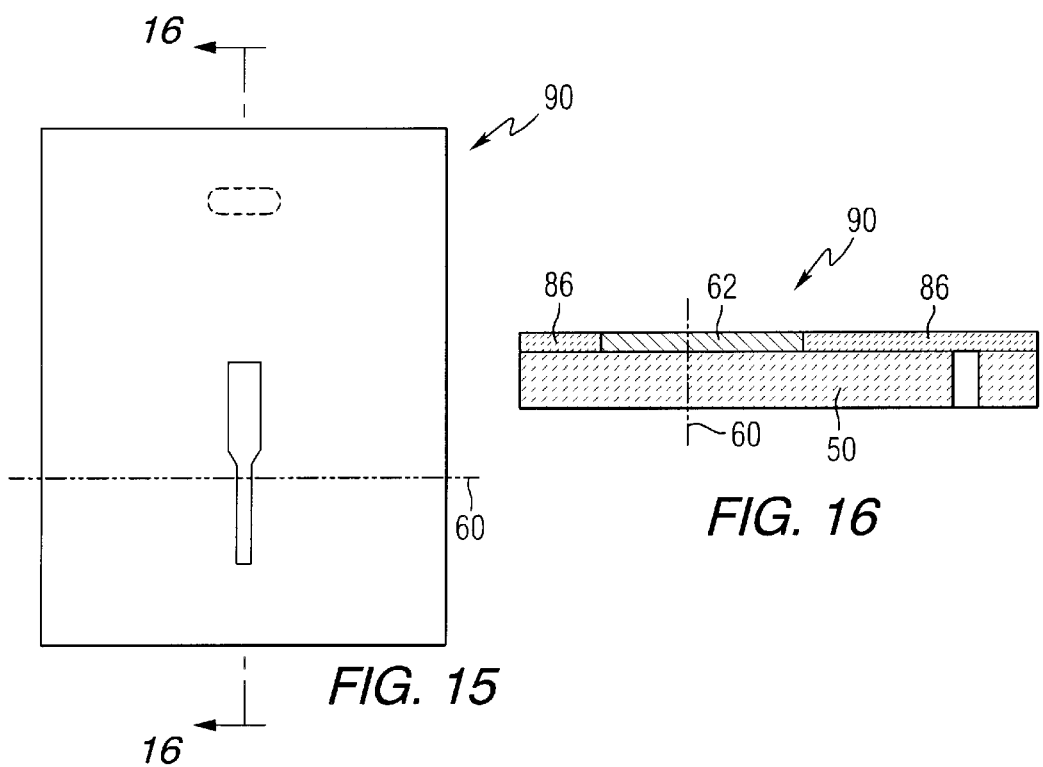
FIG. 15 is a plan view of another intermediate structure formed during fabrication of the top pole of the write head of FIG. 2.
FIG. 16 is a cross-sectional view of the structure of FIG. 15 taken along line 16—16.

The layer of FeCo is then encapsulated in a layer 86 of $Al_2O_3$. This encapsulation can be performed via ion beam deposition (IBD). IBD is chosen because of its directionality. This produces the intermediate structure 88 shown in FIGS. 13 and 14. The e-beam resist and IBD alumina are then lifted off to produce the intermediate structure 90 shown in FIGS. 15 and 16. Sonicating NMP can be used for lift-off although other lift-off techniques could be employed.

This leaves the FeCo with its given track width surrounded by alumina. The FeCo and the alumina have co-planar top surfaces. A second e-beam lithography step is used to define the flux conducting lower moment material. FIGS. 17 and 18 show the intermediate structure 92 lithographically formed by a resist 94.

Reactive ion beam etching (RIBE) or ion milling is then used to clear the FeCo as well as the alumina that is not protected by the e-beam resist. This produces the intermediate structure 96 shown in FIGS. 19 and 20. The alumina must be removed from the NiFe pedestal. This results in a trench 98. Structure 96 shows a vertical edge at the ends of the FeCo and e-beam resist patterns.

As discussed in more detail below, a second layer of magnetic material will be deposited in the trench. For high efficiency and good flux conduction, the second layer of magnetic material must be ferromagnetically coupled or in good ferromagnetic contact with the FeCo layer. One way to achieve this is to ion mill the FeCo such that an angle exists in the FeCo. This is shown in FIG. 21, where the end of the FeCo layer and the e-beam resist are positioned at an angle θ with respect to a plane perpendicular to the surface of the alumina. This angular ion mill gives an increase in surface area directly related to the angle that the edge of the FeCo makes with respect to the plane perpendicular to the surface of the $Al_2O_3$.

Another way to increase the ferromagnetic coupling area is to change the shape of the FeCo. This is done at the first e-beam define step shown in FIGS. 7 and 8. Once the FeCo goes through the second e-beam define step, it can undergo another angular ion mill. This results in the structure shown in FIG. 21. Note that the ferromagnetic coupling area can be increased by both the angular ion mill and the top pole shape defined in the first e-beam step.

A way to get even more coupling area is to take advantage of RIBE. With RIBE the $Al_2O_3$ can mill preferentially over FeCo. Going back to FIGS. 17 and 18, if RIBE was used, the result would be shown in FIG. 22, wherein the FeCo layer includes a section 100 of reduced thickness, as shown in the intermediate structure 102. The thickness of section 100 left after RIBE will depend on the selectivity of the RIBE process. The section of reduced thickness can be used to increase the area of contact between the first layer of magnetic material and the second layer of magnetic material.

Next a layer 104 of FeCoX (X=B, Zr, Hf, Ta, etc) is deposited into the trench 102 created by the RIBE as shown in FIG. 22. The FeCoX will preferably have a moment of 1.7 to 2.1T and will have a significantly higher permeability than the FeCo. Because it is ferromagnetically coupled to the NiFe pedestal, it will conduct flux from the bottom pole. In addition, it is also ferromagnetically coupled to the FeCo and since it exhibits a fairly high moment, it should be able to drive the FeCo. FeCoX deposited on section 100 of the FeCo layer, allowing a large area of ferromagnetic coupling in intermediate structure 106. No matter which method of increasing the ferromagnetic coupling area is employed, it is important that the FeCoX is deposited to be approximately planar with the FeCo. The relatively high moment, high permeability material should not stick up over the top pole to prevent inadvertent writing to the disc.

Next the e-beam resist and the FeCoX are lifted off everywhere except in the trench formed by RIBE to produce the structure 108 shown in FIGS. 25 and 26. If the FeCoX layer is too thin, then efficiency will be lowered because of decreased flux to the FeCo. If the FeCoX is too thick, the possibility exists that the flux from the FeCoX will "write." After further processing, the head would be lapped giving a structure 112 shown in FIGS. 27 and 28.

Figure 29:
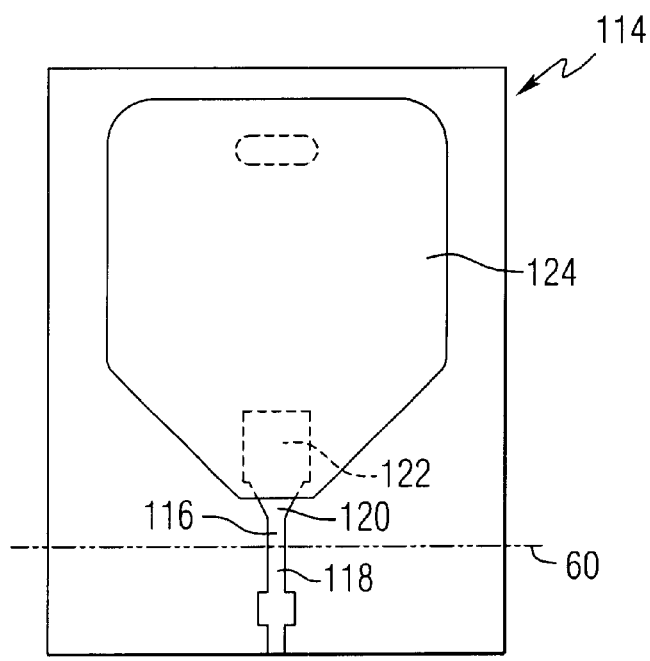
FIG. 29 is a plan view of a top pole structure for a write head constructed in accordance with another embodiment of the invention.
Figure 30:
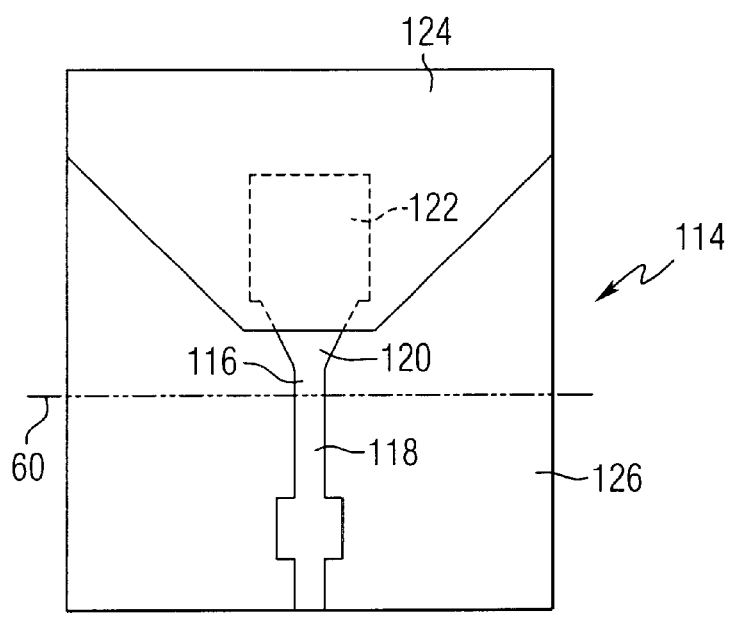
FIG. 30 is an enlarged plan view of the top pole structure of FIG. 29.

FIGS. 29 and 30 show another write head 114 constructed in accordance with this invention. In this example, the FeCo layer 116 includes a relatively narrow section 118, a transition section 120 and a wider section 122. The FeCoX layer 124 is positioned to contact section 122 and a portion of the transition section 120. The bottom portion 126 of the structure would be subsequently removed so that an edge of the FeCo layer is positioned at the air bearing surface 60.

Write heads constructed in accordance with this invention can produce sub 100 nm track widths for >100 Gb/in² areal densities, and 2.4T write fields at the ABS which also increases areal densities. In addition, FeCo is at the ABS which has a better corrosion resistance as compared to other high moment materials.

In one example of the method of this invention 2.4T FeCo is deposited, and defined at the ABS via a two-step e-beam lithography process. The FeCo is then magnetically driven by a lower moment, higher permeability material ferromagnetically coupled to the FeCo behind the ABS. This two-material top pole gives the advantages of a high moment material at the ABS (2.4T write field), while getting around the magnetic limitations of FeCo.

The top pole and bottom pole are ferromagnetically coupled and are driven by the field produced from current in the coil or stripline. The field that the perpendicular media "sees" is directly proportional to the $4\pi M_S$ of the top pole material at the ABS.

This invention can take advantage of RIBE and ion milling techniques to increase the ferromagnetic coupling between the FeCo and the FeCoX. While the described embodiment utilizes e-beam lithography to form several of the intermediate structures, it should be understood that other lithographic techniques can be used to form the intermediate structures.

In order to improve head efficiency, it is desired that the FeCo have some degree of uniaxiality. There are several methods to accomplish this. One method would be to use a processing technique which gives the FeCo some degree of uniaxiality. A second method involves biasing the FeCo. This biasing can be accomplished by using an Antiferromagnetic Material (AFM) layer or layers which couple to the FeCo through RKKY coupling such as NiFe/Ru/FeCo. The AFM or RKKY coupling layers would be deposited at the same time as the FeCo (FIG. 3) and subsequently processed.

While the present invention has been described in terms of several embodiments, it will be apparent to those skilled in the art that various modifications can be made to the disclosed embodiments without departing from the scope of the invention as set forth in the following claims.

What is claimed is:

1. A write head comprising:
   a yoke including a top pole and a bottom pole, the top pole including a layer of insulating material;
   a layer of a first magnetic material positioned on a surface of the layer of insulating material, the first magnetic material having a first end positioned adjacent to an air bearing surface of the write pole; and
   a layer of a second magnetic material positioned on the surface of the layer of insulating material, the second magnetic material having a lower magnetic moment than the first magnetic material and being positioned to conduct magnetic flux between the return pole and the layer of first magnetic material.

2. A write head according to claim 1, wherein the layer of first magnetic material comprises:
   FeCo.

3. A write head according to claim 1, wherein the layer of second magnetic material comprises:
   FeCoX, where X is selected from the group consisting of B, Zr, Hf, and Ta.

4. A write head according to claim 1, wherein a portion of the layer of second magnetic material overlaps a portion of the layer of first magnetic material.

5. A write head according to claim 1, wherein the layer of first magnetic material comprises:
   a first section having a first width and a second section having a second width, the second width being greater than the first width.

6. A write head according to claim 5, wherein the first section has a first thickness and the second section has a second thickness, the second thickness being smaller than the first thickness.

7. A write head according to claim 5, wherein a portion of the layer of second magnetic material overlaps the second section of the first layer of first magnetic material.

8. A disc drive comprising:
   a motor for rotating at least one magnetic storage medium;
   a write head for producing areas of magnetization on the magnetic storage medium;
   an arm for supporting the write head;
   an actuator for pivoting the arm to position the write head; and
   the write head including a yoke including a top pole and a bottom pole, the top pole including a layer of insulating material; a layer of a first magnetic material positioned on a surface of the layer of insulating material, the first magnetic material having a first end positioned adjacent to an air bearing surface of the write pole; and a layer of a second magnetic material positioned on the surface of the layer of insulating material, the second magnetic material having a lower magnetic moment than the first magnetic material and being positioned to conduct magnetic flux between the return pole and the layer of first magnetic material.

9. A disc drive according to claim 8, wherein the layer of first magnetic material comprises:
   FeCo.

10. A disc drive according to claim 8, wherein the layer of second magnetic material comprises:
    FeCoX, where X is selected from the group consisting of B, Zr, Hf, and Ta.

11. A disc drive according to claim 8, wherein a portion of the layer of second magnetic material overlaps a portion of the layer of first magnetic material.

12. A disc drive according to claim 8, wherein the layer of first magnetic material comprises:
    a first section having a first width and a second section having a second width, the second width being greater than the first width.

13. A disc drive according to claim 12, wherein the first section has a first thickness and the second section has a second thickness, the second thickness being smaller than the first thickness.

14. A disc drive according to claim 12, wherein a portion of the layer of second magnetic material overlaps the second section of the layer of first magnetic material.

* * * * *

UNITED STATES PATENT AND TRADEMARK OFFICE
CERTIFICATE OF CORRECTION

PATENT NO.     : 6,687,085 B2
DATED          : February 3, 2004
INVENTOR(S)    : Michael Kevin Minor et al.

It is certified that error appears in the above-identified patent and that said Letters Patent is hereby corrected as shown below:

Column 3,
Lines 58-59, "structure of Fig. 26" should read -- structure of Fig. 25 --.
Lines 63-64, "structure of Fig. 26" should read -- structure of Fig. 27 --.

Signed and Sealed this

Twenty-seventh Day of December, 2005

JON W. DUDAS
*Director of the United States Patent and Trademark Office*